US008627275B1

(12) United States Patent
Belov et al.

(10) Patent No.: US 8,627,275 B1
(45) Date of Patent: Jan. 7, 2014

(54) TECHNIQUE FOR ACQUIRING DATA STORAGE METRICS

(75) Inventors: Alexander Belov, Saint-Petersburg (RU); Dmitry Tylik, Saint-Petersburg (RU); Oksana Nekrasova, Saint-Petersburg (RU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/341,354

(22) Filed: Dec. 30, 2011

(51) Int. Cl.
*G06F 9/44* (2006.01)
*G06F 17/30* (2006.01)

(52) U.S. Cl.
USPC .......................................... 717/106; 707/769

(58) Field of Classification Search
USPC ............................. 707/769, 722; 717/106, 168
See application file for complete search history.

(56) References Cited

U.S. PATENT DOCUMENTS

| 5,425,128 A * | 6/1995 | Morrison .................... 704/243 |
| 2006/0130038 A1* | 6/2006 | Claussen et al. ............. 717/168 |
| 2008/0022258 A1* | 1/2008 | Pomponio .................... 717/106 |
| 2009/0070338 A1* | 3/2009 | Spitzig et al. ................. 707/10 |
| 2009/0313279 A1* | 12/2009 | Tomaszewski ............... 707/102 |
| 2010/0070489 A1* | 3/2010 | Aymeloglu et al. .......... 707/722 |

OTHER PUBLICATIONS

"SQL Functions," W3schools.com, downloaded from http://www.w3schools.com/sql/sql_functions.asp, Feb. 7, 2013.
"SQL AS," downloaded from http://www.1keydata.com/sql/sql-as.html, Feb. 7, 2013.
"Understanding SQL Statement Performance," Safari Books Online, Preview.
"Perform Arithmetic Operations SQL Server 2005 Tuning," GeeksEngine.com, dowloaded from http://www.geeksengine.com/database/basic-select/arithmetic-operations.php, Feb. 7, 2013.
"SQL Views, SQL Server 2000," downloaded from http://msdn.microsoft.com/en-us/library/aa214068(v=sql.80).aspx, Feb. 7, 2013.

* cited by examiner

*Primary Examiner* — Hung T Vy
(74) *Attorney, Agent, or Firm* — BainwoodHuang

(57) ABSTRACT

A technique for acquiring information about a data storage system employs compiled software constructs and an uncompiled file external to the compiled software constructs. The uncompiled file stores data inquiry definitions, such as select query and view definitions. The compiled software constructs incorporate the data inquiry definitions from the uncompiled file into database language instructions, which the compiled software constructs send to a database for processing. Results of processing the database language instructions are returned to the compiled software constructs, which return the results to an application program or other client that requested them.

18 Claims, 4 Drawing Sheets

SP_performance

| recordID | objectID | timestamp | busySystemTicks | busyUserTicks | idleTicks | waitTicks |
|---|---|---|---|---|---|---|
| 1 | SPA | 2011/11/07 10:00 | 38165721 | 27292461 | 57681704 | 427172 |
| 2 | SPA | 2011/11/07 10:05 | 38215230 | 27329820 | 57714691 | 427292 |
| 3 | SPA | 2011/11/07 10:10 | 38277514 | 27370119 | 57732094 | 427374 |
| 4 | SPA | 2011/11/07 10:15 | 38348908 | 27408037 | 57742472 | 427447 |
| 5 | SPA | 2011/11/07 10:20 | 38421506 | 27439904 | 57757781 | 427715 |

*FIG. 3*

TECHNIQUE FOR ACQUIRING DATA STORAGE METRICS

FIELD

This invention relates generally to data storage systems and, more particularly, to techniques for obtaining performance metrics from data storage systems.

BACKGROUND

Data storage systems conventionally include one or more storage processors connected to a disk array via a high-speed transmission medium, such as optical fiber. An example of a data storage system is the VNX® platform from EMC Corporation of Hopkinton, Mass.

Many data storage systems produce metrics that reflect their performance and workload. Typical metrics include the number of bytes written or read by the data storage system (i.e., the "byte count"), percent CPU consumption by the storage processor, and timing delays involved in processing reads from a disk array and writes to a disk array. Generally, one or more device drivers of the data storage system monitor and collect metrics, which are stored in a database for access by an application program, such as a program operated by a data storage administrator. Typically, the storage processor includes a software library that contains classes for performing SQL queries of the database. The software library may include a variety of classes, e.g., one class for each metric that the data storage system produces. In operation, the application program sends a command requesting metric information to a class of the software library. The class executes a SQL query on the database, post-processes the query results, and reports the post-processed query results to the application program, where the results may be presented to the data storage administrator.

SUMMARY

Unfortunately, the classes within the software library for accessing metrics of the data storage system are difficult to maintain. The class for each metric generally includes one or more SQL queries into the database. The class also includes instructions for post-processing query results, such as to compute statistics and/or to measure changes in the respective metric over time. In some examples, performing these querying and post-processing functions can require thousands of lines of code. The software library is generally provided as compiled code that is run in executable form. Any error in the SQL queries or the post-processing of query results thus requires an examination, debug, and revision of the class, followed by a recompile, generally of the entire software library. Management of these classes has become ever more troublesome as the number of metrics produced by data storage systems has increased.

In contrast with the prior approach, in which queries and post-processing are encoded in compiled classes that are difficult to maintain, an improved technique for acquiring information about a data storage system employs one or more compiled software constructs and an uncompiled file external to the compiled software constructs. The compiled software constructs include database language instructions for obtaining data storage information from a database. The uncompiled file, which in some examples is a human-readable file, stores "data inquiry definitions," i.e., definitions of queries, views, and/or other database reporting structures. The compiled software constructs access the uncompiled file, incorporate data inquiry definitions into the database language instructions, and send the database language instructions to the database. Results from running the database language instructions on the database are returned to the compiled software constructs, which return the results to an application program or other client that requested them. The data inquiry definitions can be arbitrarily complex, and can be written to perform tasks previously performed as post-processing within the classes. Using this technique, the compiled software constructs can be kept comparatively simple and uniform, with the complex aspects of data selection and post-processing provided externally, in an uncompiled file, which is comparatively easy to maintain.

In some examples, a different compiled software construct is provided for each metric or computation based on metrics. In other examples, only a single compiled software construct is provided, which forms a generic template that can be used for any metric or computation based on a metric. In still other examples, multiple compiled software constructs are provided, but not one for each metric. Rather, different compiled software constructs are provided for performing different types of processing, and each type of compiled software construct may be used for multiple metrics or computations.

One embodiment of the improvement hereof is directed to a method for obtaining information about a data storage system. The method includes receiving a request for information from a data storage application. The method further includes executing, in response to the request, a compiled software construct to retrieve from a database a set of metrics indicative of performance of the data storage system. The compiled software construct includes a database language instruction, and the database language instruction includes a reference to a data inquiry definition stored in an uncompiled file external to the compiled software construct. In addition, the method includes sending the database language instruction, including the data inquiry definition, to the database, to execute the database language instruction on the database and produce a result. The method still further includes receiving the result of the database language instruction by the compiled software construct and returning information to the data storage application based on the result of the database language instruction.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will become apparent from the following description of particular embodiments of the invention, as illustrated in the accompanying drawings, in which like reference characters refer to the same parts throughout the different views. In the accompanying drawings.

FIG. 3 is an example table of metric values collected in the environment of FIG. 1.

DETAILED DESCRIPTION OF THE INVENTION

An improved technique for acquiring information about a data storage system employs one or more compiled software constructs and an uncompiled file external to the compiled software constructs that stores data inquiry definitions. The compiled software constructs access the uncompiled file, incorporate data inquiry definitions into database language instructions, and send the database language instructions to the database. Results from running the database language instructions on the database are returned to the compiled software constructs, which return the results to an application program or other client that requested them.

Figure 1:
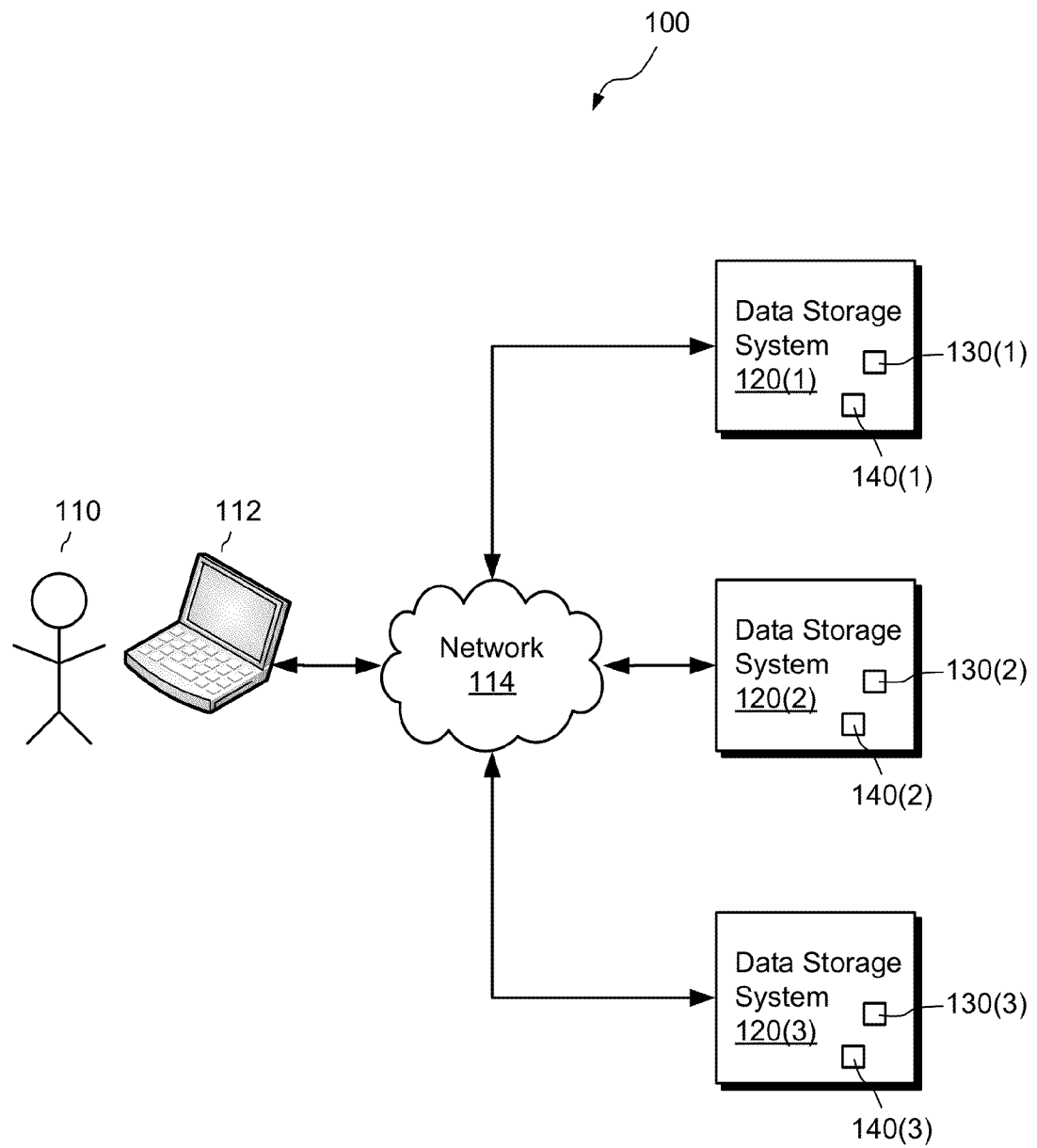
FIG. 1 is block diagram of an example environment in which an improved technique may be employed for obtaining metric information from data storage systems.

FIG. 1 shows an example environment 100 in which an improved technique may be applied for obtaining metric information from data storage systems. The environment 100 includes a computing device 112, a network 114, and a number of data storage systems 120(1), 120(2), and 120(3). The computing device 112 is operable by a user 110, such as a data storage administrator. Any number of data storage systems may be provided. Each data storage system 120(1-3) includes a compiled library 130(1-3) and an uncompiled file 140(1-3). The uncompiled file 140(1-3) stores data inquiry definitions, i.e., definitions of queries, views, and/or other database reporting structures.

The computing device 112 can be any type of computing device capable of running a program that communicates with the data storage systems 120(1-3) over the network 114. Suitable examples of the computing device 112 include desktop computers, laptop computers, and workstations, as well as tablet computers, smart phones, and other devices. The network 114 is typically the Internet, but can be any network, including a cellular telephone network, satellite network, local area network (LAN), wide area networks (WAN), and the like.

In typical operation, the user 110 starts a client program on the computing device 112 to obtain information about any of the data storage systems 120(1-3). For example, the user may operate the client program to view values of metrics, or of calculations based on metrics, from any of the data storage systems 120(1-3), including, for example, byte count, CPU utilization, timing latencies, and other metric values and/or calculations. The client program communicates with the data storage systems 120(1-3) over the network 114. In response to requests from the client program, the data storage systems 120(1-3) perform processes to obtain the requested metric values and/or calculations.

Figure 2:
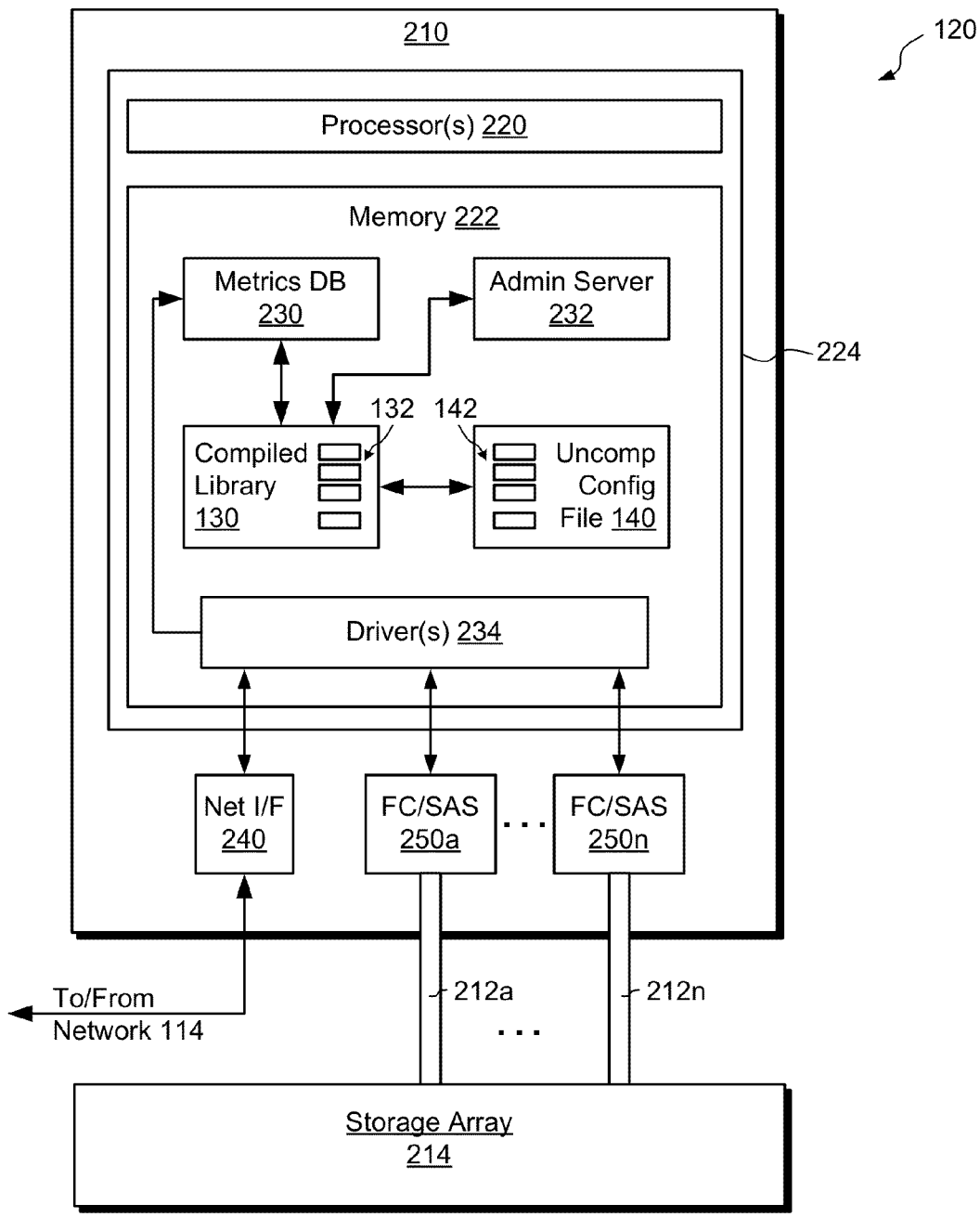
FIG. 2 is a block diagram of an example data storage system of FIG. 1.

FIG. 2 shows an example data storage system 120 in additional detail. The data storage system 120 is typical of any of the data storage systems 120(1-3) of FIG. 1. The data storage system 120 includes a computing system 210, a number of transmission media 212a-212n, and a storage array 214. The computing system 210 may be a high speed computer, such as a server-grade computer, for example. The transmission media 212a-212n may be fiber optic cables, such as Fibre Channel cables. The storage array 214 is generally a disk array or an array of other non-volatile storage elements. The storage array 214 may in some examples be implemented as a disk array enclosure (DAE) including link control cards (LLCs) for connecting to the transmission media 212a-212n. The computing system 210, transmission media 212a-212n, and storage array 214 can be provided in a variety of forms, however, according to the requirements of the particular implementation.

The computing system 210 includes a set of processors 220 (i.e., one or more processors or processing boards), memory 222, a network interface 240, and a number of Fibre Channel/Serial Attach SCSI (FC/SAS) ports 250a-250n. The FC/SAS ports 250a-n are connected to the storage array 214 via the transmission media 212a-212n. The set of processors 220 and the memory together form a specialized circuit 224, for performing various functions and processes as described hereinbelow.

The memory 222 stores various software constructs. These include a compiled library 130 (i.e., typical of any of the compiled libraries 130(1-3) of FIG. 1) and an uncompiled file 140 (i.e., typical of any of the uncompiled files 140(1-3) of FIG. 1). The software constructs in the memory 222 also include a database 230, an administrative server 232, and a set of drivers (i.e., one or more drivers) 234. The memory 220 typically includes both volatile and nonvolatile portions.

The database 230 includes one or more tables that store metric values. Each table includes a set of fields and a number of records. Each record stores values for some or all of the fields of the respective table. In some examples, new metric values are collected at regular intervals, such as every five minutes. A new record is written to each table of the database 230 each time new metric values are collected.

The database 230 is compatible with a database query language, such as Structured Query Language (SQL, including any of its variants), Common Interface Model (CIM) Query Language (CQL), and many others. Also, the database 230 can be provided in the form of a single database file or as multiple database files.

The administrative server 232 is a server-side application that runs in coordination with the client program operable by the user 110. In some examples, the administrative server 232 is implemented as a web server running a web application, which serves web pages and other content to the client program. In other examples, the administrative server 232 is the server side of a client-server application. The administrative server 232 communicates with the compiled library 130 to obtain metric values from the database 230, for presentation to the user 110. An example of an administrative server 232 is the UniSphere® unified storage management solution by EMC Corporation of Hopkinton, Mass.

The driver(s) 234 include one or more device drivers for managing hardware of the data storage system 120. These may include a driver for managing CPU processing and/or a driver for managing I/O requests (i.e., requests for reads and writes of the storage array 214). The driver(s) 234 may also include drivers for managing other functions of the computing system 210, which also produce metric values. In some examples, the driver(s) 234 are implemented as kernel extensions. The driver(s) 234 collect metric values, which are transferred to the database 230.

The compiled library 130 includes a number of compiled software constructs 132. In some examples, each compiled software construct 132 pertains to a different metric or to a different computation (such as a mathematical computation based on metrics or a statistic). In other examples, only a single compiled software construct 132 is provided, which forms a generic template for accessing any metric or computation. In still other examples, multiple compiled software constructs are provided, with each performing a different type of database processing. Each software construct 132 includes one or more database language instructions for accessing the database 230 and extracting particular metric values from one or more tables of the database 230. Each database language instruction includes a reference to a data inquiry definition 142 stored in the uncompiled file 140. Each software construct 132 may further include instructions for post-processing metric values read back from the database 230. As will become apparent, however, the amount of post-processing is typically very small compared with conventional techniques.

The compiled software constructs 132 can be written in any suitable programming language. Also, the compiled software constructs 132 can be provided in a variety of forms, such as functions, subroutines, procedures, entry points into larger code constructs, object classes, or other forms. In one embodiment, the compiled software constructs 132 are C++ classes compiled using a C++ compiler.

The database language instructions within the compiled software constructs 132 are written in a database language, such as Structured Query Language (SQL), CIM Query Language (CQL), or any of a number of other database languages. Each database language instructions generally includes a SELECT statement having a FROM designator. Other designators may be provided as well. An example database language instruction may take the following form:

SELECT <fields> FROM <source> WHERE <criteria> ORDER BY<one of the fields> <direction> LIMIT <maximum number of records>.

The above instruction specifies a select query of the "source" for data contained in the listed "fields." Results are filtered by the "criteria," and are ordered by the specified "field" of the "source." Data are presented in the indicated "direction" (e.g., ascending or descending) and are limited to the "maximum number of records." A specific example of a database language instruction having the above form may written into the source code for a compiled software construct 132 as, for example, a string value prior to compiling. It is understood that the names SELECT and FROM are merely descriptive of the functions associated with the names and can be varied as long as the underlying functions are substantially as described. The fact that these names are language elements of SQL should not be construed as limiting the language of the database language instruction to SQL.

The "source" in the above example database language instruction is a reference to a data inquiry definition 142 stored in the uncompiled file 140. In some examples, the reference is simply a name of the data inquiry definition or a name associated with a data inquiry definition 142. In other examples, the reference is a pointer or some other designation.

In contrast with the compiled file 130, which once compiled cannot be read by a human, the uncompiled file 140 is preferably a human-readable file, such as a structured text file. Examples of structured text files include XML (Extensible Markup Language) and JSON (JavaScript Object Notation) files. Although the uncompiled file 140 can be implemented as other types of files, XML, JSON, and similar file types are preferred because many parsers and validators are available for use with these file types.

The uncompiled file 140 includes a number of data inquiry definitions 142. Each data inquiry definition 142 specifies a particular inquiry into the database 230, such as a select query, view, or other database reporting structure. As is known, select queries and views are database elements for inspecting the contents of database tables based on certain criteria. Data inquiry definitions 142 can store select queries and views in a variety of ways. In some examples, different elements of select queries and views are stored within different tags or parameters of the uncompiled file 140. These elements can be gathered together by the compiled software constructs 132 and assembled into complete select query or view definitions. In other examples, the uncompiled file 140 stores the data inquiry definitions 142 as complete database language instructions (e.g., as textual SQL instructions) within a single set of tags or as a single parameter. Examples of data inquiry definitions 142 will now be described with reference to FIG. 3.

FIG. 3 shows an example table 300 of the database 230. The example table 300 has the name "SP_performance" and stores metric values pertaining to the CPU activity of a storage processor (i.e., the computing system 210). The metric values are obtained by the driver(s) 234 at five-minute intervals and stored as separate records in the table 300.

The table 300 has seven fields, including recordID, objectID, and timestamp. The recordID increments for each record and thus may operate as a primary key. The objectID specifies the object, i.e., a portion of the data storage system 120, to which the record pertains (e.g., "SPA" for storage processor A). The timestamp records the date and time when metric values are obtained.

Specific metric values are specified in the remaining fields. These include busySystemTicks, busyUserTicks, idleTicks, and waitTicks. BusySystemTicks designates the number of CPU cycles applied to system processes, whereas busyUserTicks designates the number of CPU cycles applied to user processes. IdleTicks designates the number of cycles for which the CPU was idle, while waitTicks designates the number of cycles spent waiting for various processes to complete.

Various data inquiry definitions 142 can be stored in the uncompiled file 140 for defining select queries and/or views of data stored in the table 300. Below is an example data inquiry definition 142 defining a select query into the table 300:

<busySystemTicks_Delta>
SELECT
a.objectID AS objectID,
a.timestamp AS timestamp,
(a.busySystemTicks−b.busySystemTicks) AS BUSY_DIFF FROM SP_performance a, SP_performance b WHERE a.recordID==(b.recordID+1) AND a.objectID==b.objectID
</busySystemTicks_Delta>

The tags <busySystemTicks_Delta></busySystemTicks_Delta> identify the select query by name. The compiled software constructs 132 can use this name as a "source" in connection with a FROM designator in a database language instruction to reference the above select query.

The contents of this select query (i.e., the portions between the tags <busySystemTicks_Delta></busySystemTicks_Delta>) are standard SQL. The purpose of this calculation is to compute the difference in the field busySystemTicks between two adjacent records of the table 300. The expression a.recordID represents a first record, and the expression b.recordID represents a second record.

The above example of a data inquiry definition 142 can also be provided in the form of a view. The following view is equivalent to the above select query:

<busySystemTicks_Delta>
CREATE VIEW Busy_System_Ticks_Delta_View AS
SELECT
a.objectID AS objectID,
a.timestamp AS timestamp,
(a.busySystemTicks−b.busySystemTicks) AS BUSY_DIFF FROM SP_performance a, SP_performance b WHERE a.recordID==(b.recordID+1) AND a.objectID==b.objectID
</busySystemTicks_Delta>

Unlike the select query, the above-defined view has a name (Busy_System_Ticks_Delta_View). The compiled software constructs 132 can refer to the view using this name, or, as with the select query, using the name set forth by the tags <busySystemTicks_Delta></busySystemTicks_Delta>. Note that this view includes a select query in its definition.

Another typical example is to calculate a rate of change of a metric over time. For instance, the view defined above can be modified to calculate the rate of change of busySystemTicks between two adjacent records:

<busySystemTicksRate>
CREATE VIEW Busy_System_Ticks_Rate_View AS SELECT
a.objectID AS objectID,
a.timestamp AS timestamp,
((a.busySystemTicks−b.busySystemTicks)/(a.timestamp−b.timestamp)) AS BUSY_DIFF
FROM SP_performance a, SP_performance b WHERE a.recordID==(b.recordID+1) AND a.objectID==b.objectID
</busySystemTicksRate>

A compiled software construct 132 can reference the above view by the name Busy_System_Ticks_Rate_View or by using the name defined by the tags <busySystemTicksRate></busySystemTicksRate> to access the rate calculating definition.

Select queries and views can involve complex processing. For example, the following data inquiry definition 142 defines a view for obtaining metric values and processing them to compute the percent CPU usage between adjacent records of the table 300:

<CPUUsage>
CREATE VIEW CPU_Usage_View AS SELECT
a.objectID AS objectID,
a.timestamp AS timestamp,
((a.busySystemTicks+a.busyUserTicks+a.waitTicks−(b.busySystemTicks+b.busyUserTicks+b.waitTicks))*100/(a.busySystem Ticks+a.busyUserTicks+a.idleTicks+a.waitTicks−(b.busySystemTicks+b.busyUserTicks+b.idleTicks+b.waitTicks))) AS SP_Percent
FROM SP_performance a, SP_performance b WHERE a.recordID==(b.recordID+1) AND a.objectID==b.objectID
</CPUUsage>

The processing included in the example above is easily read and modified, as it is human-readable and persists in an uncompiled state.

The uncompiled file 140 may include a large number of data inquiry definitions 142 of varying levels of complexity. Some of the data inquiry definitions 142 simply report raw metric values, whereas others perform calculations and/or statistics.

Although the data inquiry definitions 142 can be implemented as select queries or views, and may in some examples include both, it is generally preferred that the data inquiry definitions 142 use views rather than select queries, as views are typically more flexible. Unlike select queries, views can include other views by name, a feature that allows code to be simpler and more easily debugged and understood. For example, the following sequence of views can be defined:

CREATE VIEW v1 AS SELECT . . . FROM table1, table2 WHERE . . .
CREATE VIEW v2 AS SELECT . . . FROM table3, table4 WHERE . . .
CREATE VIEW v3 AS SELECT . . . FROM v1, v2 WHERE . . .
CREATE VIEW v4 AS SELECT . . . FROM v1, v2 WHERE . . .
CREATE VIEW v5 AS SELECT . . . FROM v3, v4 WHERE . . .

Each of these view definitions is manageable and relatively easy to understand. In contrast, the equivalent select query for view v5, for example, would be extremely complex, difficult to read, and difficult to debug. Also, the select query would not include modular elements that could be reused in other data inquiry definitions 142.

It is evident from these examples that the database language instructions for the data inquiry definitions 142 can be arbitrarily complex. They can include multiple tables, multiple records, and a wide range of mathematical operations. These operations are prone to programming errors and may not work properly in all cases even after they are initially debugged. Providing the data inquiry definitions 142 outside the compiled library 130 greatly simplifies software development and maintenance, as any errors can be readily addressed in the uncompiled file 140, without having to recompile the library 130.

Also, providing computations in the data inquiry definitions 142 allows the uncompiled software constructs 132 to be kept relatively simple and uniform. Each uncompiled software construct 132 can be written using a SELECT statement that specifies a data inquiry definition 142 in its FROM designator. The complexities of selecting metric values and processing them are therefore exported to the uncompiled file 140. Further simplifications can be achieved by writing the data inquiry definitions 142 with views, which are usually easy to read and can be incorporated modularly in the definitions of other views in the uncompiled file 140.

In some examples, still further simplifications can be achieved by providing only a single compiled software construct 132 for accessing all of the data inquiry definitions 142. Here, the compiled software construct 132 includes a generic template having one or more database language instructions applicable to any data inquiry definition. Different metrics or computations can be reported through the single compiled software construct 132, thus further simplifying the compiled code and reducing the labor and complexity of code maintenance.

In other examples, only a small number of compiled software constructs 132 are provided, e.g., one for each type of processing. For instance, one compiled software construct 132 can be provided for data inquiry definitions structured as select queries, whereas another compiled software construct 132 can be provided for data inquiry definitions structured as views.

Figure 4:
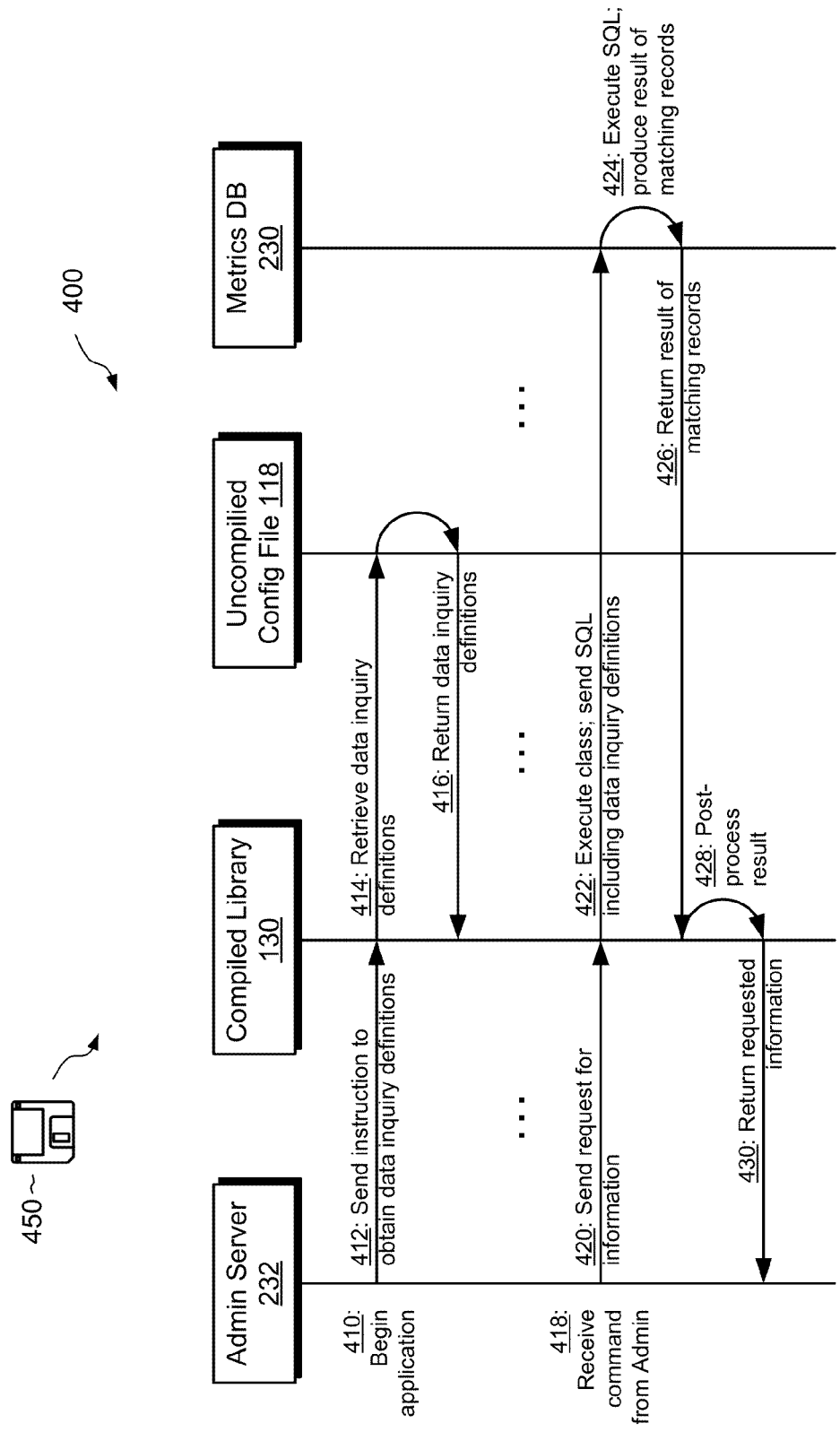
FIG. 4 is a sequence diagram of an example process for obtaining information about the data storage system of FIG. 2.

FIG. 4 shows a process 400 for obtaining information about a data storage system 120. The process 400 may be carried out in connection with the computing environment 100 and is typically performed by the software constructs described in connection with FIGS. 1 and 2, which reside in the memory 222 of the computing system 210 and are run by the set of processors 220.

The process 400 is conducted among the administrative server 232, the compiled library 130, the uncompiled file 140, and the database 230. The process 400 involves obtaining data inquiry definitions 142 from the uncompiled file 140 and using the definitions 142 in querying the database 230.

At event 410, the administrative server 232 is started, generally when the computing system 210 is booted or at a later time at the request of the user 110. After starting, at event 412, the administrative server 232 sends an instruction to the compiled library 130 to obtain all of the data inquiry definitions 142. At event 414, the compiled library 130 accesses the uncompiled file 140, retrieves the data inquiry definitions 142, and, at event 416, receives the data inquiry definitions 142 from the uncompiled file 140.

At some later time, designated as event 418, the administrative server 232 receives a command that includes a request for metric information. The command is generally received from the client program in response to an action from the user 110, such as a request for information about an object of the data storage system 120. At event 420, the administrative server 232 sends a request for the particular information to the compiled library 130. For example, the administrative server 232 may identify the metric or object about which information is requested and access a compiled software construct 132 in the compiled library 130. The compiled software construct 132 may be specific to the metric or object requested, or it may be provided in a more generic form applicable to many metrics or objects. At event 422, the compiled software construct 132 sends a database language instruction to the database 230. The database language instruction includes one of the data inquiry definitions 142 received at event 416. For example, the database language instruction sent to the database 230 may include an SQL instruction of the form, SELECT <fields> FROM <source> WHERE <criteria> ORDER BY<one of the fields> <direction> LIMIT <maximum number of records>, where the data inquiry definition 142 is supplied as the "source" for the FROM designator.

At event 424, the database 230 runs the database language instruction and produces a result including a set of matching records. At event 426, the result is sent back to the compiled software construct 132 within the library 130. At event 428, the compiled software construct 132 performs minimal, if any, post-processing on the result. The post-processed result (or simply the result) is sent back to the administrative server 232 (event 430) and then may be sent back to the computing device 112, for presentation to the user 110.

The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

In certain embodiments, the data inquiry definitions 142 are not retrieved before the user 110 requests information but rather after. When the compiled library 130 receives a request for metric information (as in event 420), a compiled software construct 132 retrieves the needed data inquiry definition 142 from the uncompiled file 140, effectively as needed and on demand.

An improved technique for acquiring information about a data storage system 120 has been described that employs one or more compiled software constructs 132 and an uncompiled file 140 external to the compiled software constructs 132 that stores data inquiry definitions 142. The data inquiry definitions 142 can be arbitrarily complex and can be written to perform tasks previously performed within compiled software classes. Using this technique, the compiled software constructs 132 can be kept comparatively simple and uniform, with the complex aspects of selecting and processing data provided externally, in an uncompiled file 140, which is comparatively easy to write and maintain.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described one embodiment, numerous alternative embodiments or variations can be made. For example, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method for obtaining information about a data storage system, comprising:

receiving a request for information from a data storage application;

executing, in response to the request, a compiled software construct to retrieve from a database a set of metrics indicative of performance of the data storage system, the compiled software construct including a database language instruction, the database language instruction including a reference to a data inquiry definition stored in an uncompiled file external to the compiled software construct;

sending the database language instruction, including the data inquiry definition, to the database, to execute the database language instruction on the database and produce a result;

receiving the result of the database language instruction by the compiled software construct; and returning the information to the data storage application based on the result of the database language instruction, wherein a first field of the database stores metric values of the data storage system and a second field of the database stores time values indicating when respective metric values stored in the first field of the database were obtained, wherein the data inquiry definition in the uncompiled file includes an arithmetic operation to be applied between a first record and a second record of the database, the first record and the second record of the database each including a value for the first field and a value the second field, and wherein the arithmetic operation includes:

subtracting a value of the first field in the first record from a value of the first field in the second record to calculate a metric difference value, subtracting a time value in the second field of the first record from a time value in the second field of the second record to calculate a time difference; and dividing the metric difference value by the time difference to calculate a metric rate of change.

2. The method as recited in claim 1, wherein the database language instruction of the compiled software construct includes a database language SELECT statement having a database language FROM designator that specifies the reference to the data inquiry definition.

3. The method as recited in claim 2, further comprising:
opening the uncompiled file;
locating the data inquiry definition within the uncompiled file; and
inserting the data inquiry definition from the uncompiled file into the SELECT statement in the compiled software construct.

4. The method as recited in claim 3, wherein the uncompiled file is a structured text file.

5. The method as recited in claim 3, wherein the data inquiry definition in the uncompiled file includes an arithmetic operation to be applied between a first record and a second record of a table of the database, the first record and the second record storing metric values of the data storage system.

6. The method as recited in claim 5, wherein the arithmetic operation includes subtracting a first value of a field in the first record from a second value of the same field in the second record to calculate a metric difference value.

7. The method as recited in claim 6, wherein a second field of the table of the database stores time values, and the arithmetic operation further includes:
subtracting a time value in the second field of the table of the first record from a time value in the second field of the table of the second record to calculate a time difference; and
dividing the metric difference value by the time difference to calculate a metric rate of change.

8. The method as recited in claim 3, wherein the data inquiry definition in the uncompiled file includes a database language select query definition based on at least one table of the database storing metric values of the data storage system.

9. The method as recited in claim 3, wherein the data inquiry definition in the uncompiled file includes a database language view definition based on at least one table of the database storing metric values of the data storage system.

10. The method as recited in claim 9, wherein the database language view definition includes at least one database language select query definition.

11. The method as recited in claim 10, wherein the database language view definition includes a reference to another database language view definition within the uncompiled file.

12. A data storage system, comprising:
a set of processors; and
memory, coupled to the set of processors, the memory constructed and arranged to store instructions executable by the set of processors,
wherein the set of processors executing instructions from the memory forms a specialized circuit constructed and arranged to:
receive a request for information from a data storage application;
execute, in response to the request, a compiled software construct to retrieve from a database a set of metrics indicative of performance of the data storage system, the compiled software construct including a database language instruction, the database language instruction including a reference to a data inquiry definition, wherein to execute the compiled software construct includes to retrieve the data inquiry definition from an uncompiled file external to the compiled software construct;
send the database language instruction, including the data inquiry definition, to the database, to execute the database language instruction on the database and produce a result;
receive the result of the database language instruction by the compiled software construct; and
return the information to the data storage application based on the result of the database language instruction,
wherein a first field of the database stores metric values of the data storage system and a second field of the database stores time values indicating when respective metric values stored in the first field of the database were obtained,
wherein the data inquiry definition in the uncompiled file includes an arithmetic operation to be applied between a first record and a second record of the database, the first record and the second record of the database each including a value for the first field and a value the second field and
wherein the arithmetic operation includes:
subtracting a value of the first field in the first record from a value of the first field in the second record to calculate a metric difference value,
subtracting a time value in the second field of the first record from a time value in the second field of the second record to calculate a time difference; and
dividing the metric difference value by the time difference to calculate a metric rate of change.

13. The data storage system as recited in claim 12, wherein the database language instruction of the compiled software construct includes a SELECT statement having a FROM designator that specifies the reference to the data inquiry definition.

14. The data storage system as recited in claim 12, wherein the data inquiry definition in the uncompiled file includes a database language view definition based on at least one table of the database storing metric values of the data storage system.

15. The data storage system as recited in claim 14, wherein the database language VIEW definition includes a reference to another database language view definition within the uncompiled file.

16. A non-transitory computer readable medium including instructions which, when executed by a set of processors of a computing device, cause the set of processors to perform a method for obtaining information about a data storage system, comprising:
receiving a request for information from a data storage application;
executing, in response to the request, a compiled software construct to retrieve from a database a set of metrics indicative of performance of the data storage system, the compiled software construct including a database language instruction, the database language instruction including a reference to a data inquiry definition, wherein executing includes retrieving the data inquiry definition from an uncompiled file external to the compiled software construct;
sending the database language instruction, including the data inquiry definition, to the database, to execute the SQL instruction on the database and produce a result;
receiving the result of the database language instruction by the compiled software construct; and
returning the information to the data storage application based on the result of the database language instruction, wherein a first field of the database stores metric values of the data storage system and a second field of the database stores time values indicating when respective metric values stored in the first field of the database were obtained, wherein the data inquiry definition in the uncompiled file includes an arithmetic operation to be applied between a first record and a second record of the database, the first record and the second record of the database each including a value for the first field and a value the second field and wherein the arithmetic operation includes:
 subtracting a value of the first field in the first record from a value of the first field in the second record to calculate a metric difference value,
 subtracting a time value in the second field of the first record from a time value in the second field of the second record to calculate a time difference; and
 dividing the metric difference value by the time difference to calculate a metric rate of change.

17. The non-transitory computer readable medium as recited in claim 16, wherein the compiled software construct includes a compiled C++ class and wherein the uncompiled file is an XML file.

18. The non-transitory computer readable medium as recited in claim 16, wherein the data inquiry definition in the uncompiled file includes a database language view definition based on at least one table of the database storing metric values of the data storage system.

\* \* \* \* \*